United States Patent [19]

Flint

[11] Patent Number: 5,050,976
[45] Date of Patent: Sep. 24, 1991

[54] HUB AND PETAL APPARATUS FOR MOSAIC MIRRORS AND MILLIMETER WAVE ANTENNAS

[75] Inventor: Graham W. Flint, Albuquerque, N. Mex.

[73] Assignee: The United States of America as represented by the Secretary of the Air Force, Washington, D.C.

[21] Appl. No.: 545,247

[22] Filed: Jun. 28, 1990

[51] Int. Cl.$^5$ .......................... G02B 5/10; G02B 7/18; H01Q 15/16
[52] U.S. Cl. .................... 359/851; 343/912; 362/346; 359/855
[58] Field of Search ............... 350/613, 616; 343/912, 343/916; 362/346, 297, 302

[56] References Cited

U.S. PATENT DOCUMENTS

| | | | |
|---|---|---|---|
| 1,248,456 | 12/1917 | Clark | 350/613 |
| 3,378,469 | 4/1968 | Jochim | 204/7 |
| 3,428,533 | 2/1969 | Pichel | 204/7 |
| 4,066,887 | 1/1978 | Levis | 350/613 |
| 4,116,541 | 9/1978 | Weiss | 350/613 |
| 4,568,945 | 2/1986 | Winegard et al. | 343/916 |
| 4,740,276 | 4/1988 | Marmo et al. | 204/7 |
| 4,893,132 | 1/1990 | Habibi | 343/912 |

FOREIGN PATENT DOCUMENTS 172805  9/1984  Japan ................. 343/912

Primary Examiner—Jon W. Henry
Attorney, Agent, or Firm—William Stepanishen; Donald J. Singer

[57] ABSTRACT

A mirror or antenna apparatus having individual petal segments, each of a complex shape, mated with a central hub assembly. Registration pads are provided on the hub assembly to align the petal segments with respect to the hub and each other. Electrical actuators provide fine tuning adjustments in the order of microns.

11 Claims, 1 Drawing Sheet

HUB AND PETAL APPARATUS FOR MOSAIC MIRRORS AND MILLIMETER WAVE ANTENNAS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a multi-element or mosaic antenna structures, and in particular to a hub and petal configuration for large mosaic mirrors and millimeter wave antennas.

The state of the art of large multi-element antennas are well represented and alleviated to some degree by the prior art apparatus and approaches which are contained in the following U.S. Patents:

U.S. Pat. No. 3,378,469 issued to Jochim on Apr. 16, 1968;

U.S. Pat. No. 3,428,533 issued to Pichel on Feb. 18, 1969; and

U.S. Pat. No. 4,740,276 issued to Marmo et al on Apr. 26, 1988.

The Jochim patent describes a method of simultaneously providing the backing or rigidizing structure which is also electroformed, and the electroformed device itself, whether it be a mirror or some other device. This is done by halting the electroplating of the device before it is finished and applying a properly shaped mesh to it. The electroplating process is then continued so that the mesh becomes permanently affixed to and becomes an integral part of the device being electroformed, thereby providing the backing structure for it in substantially the same step in which the device is formed.

The Pichel patent discloses a method of casting a plastic sub-master from a glass master. A layer of nickel is deposited over the plastic sub-master to provide a metal replica. A structure is mounted onto the metal replica to rigidize it. The rigidized replica is then parted from the sub-master, after which a hard surface, such as a rhodium or chromium surface, is plated over the nickel face of the replica to provide it with a scratch and abrasion resistant surface. At this point, the rigidized metal replica may be utilized instead of the glass master and as many plastic submasters made from it as may be needed.

The Marmo et al patent is directed to a method of electroforming a continuous faceplate which contains coolant channels just below the optical surface. The continuous faceplate is bonded to a rigidized substrate to prevent distortion of the faceplate during or after separation from a master. A circular ring land on the rear surface of the individual master segments greatly provides improved segment alignment and rigidity over prior art mounting surfaces.

While the above-cited prior art patents are instructive, it is clear that a need remains to provide large mosaic mirrors and millimeter wave antennas which solves the shortcomings of the prior art. The present invention is intended to satisfy that need.

SUMMARY OF THE INVENTION

The present invention relates to large mirrors and antennas with surfaces that are formed by an electroforming process. The surfaces are precision formed with an accuracy indicated to be on the order of one wavelength of visible light. The mirrors that are formed are multi-element, or mosaic in nature, for use as satellite-borne optics. The process of the invention allows the production of mirrors which are larger in size than that which could be electroformed as a monolithic structure. The mosaic structure takes the form of individual petals, each of a complex shape, which are united with a hub assembly. A number of registration pads on the hub are used to align each petal in tip, tilt, rotation, piston, and radial position with respect to the axis of the hub assembly. The structure of the invention is adapted to be assembled in a location to which it is taken, such as a space environment.

It is one object of the present invention, therefore, to provide an improved large mosaic antenna apparatus utilizing a hub and petal assembly arrangement.

It is another object of the invention to provide a large mosaic antenna apparatus wherein the registration surfaces on the electroformed parts are simple surfaces of cylindrical and plane configuration which are easy to achieve via single point diamond turned mandrels.

It is yet another object of the invention to provide a large mosaic antenna apparatus wherein the use of a single point diamond turned hub with a stepped flange in the geometry shown allows considerable tolerance in the angular subtent of each segment.

It is still another object of the invention to provide a large mosaic antenna apparatus wherein the use of a single point diamond turned hub provides registration of each mirror segment such that the positional error of each segment is determined by a single set of registration surfaces.

It is an even further object of the invention to provide a large mosaic antenna apparatus wherein piezo-electric or electrostrictive actuator pads are utilized for fine tuning.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
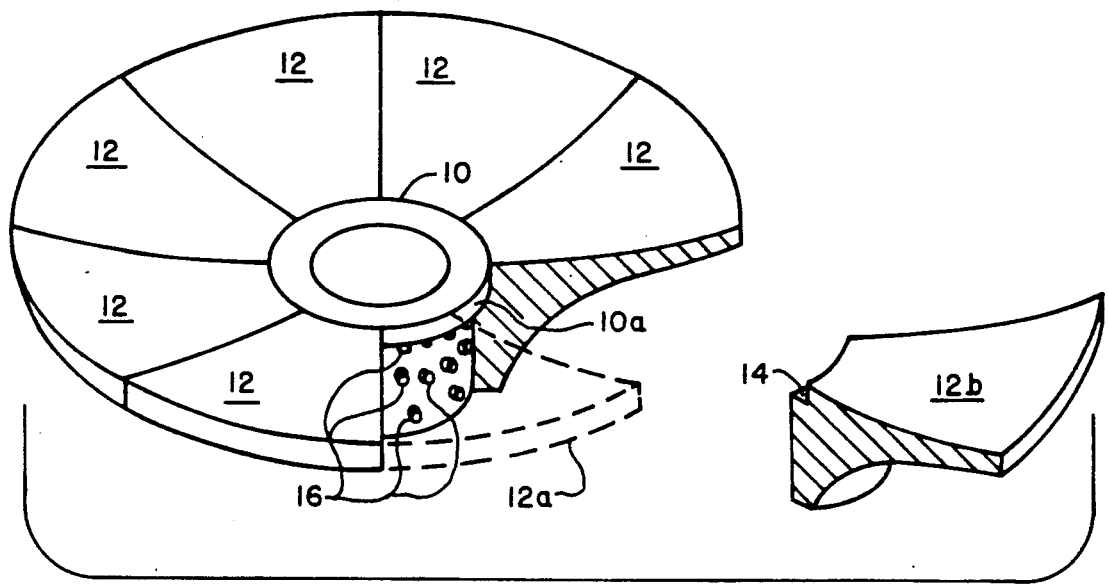
FIG. 1 is a perspective view of the hub and petal mosaic apparatus according to the present invention.

Referring now to FIG. 1, there is shown a perspective view of a parabolic mosaic mirror utilizing the hub 10 and petal 12 configuration. A plurality of petals 12 are arranged around the hub 10. One petal 12a is shown in phantom and another petal 12b is removed to show in greater detail the shape of the petal segment. Petal 12b, as do all the petals 12, has a step 14 which mates with the flange 10a on the hub 10. The hub 10 also includes a number of registration pads 16. In the present example each segment petal 12 utilizes five registration pads 16 to align the petal segments to the hub 10 and each other. As shown, the mosaic mirror takes the form of a hub and petal structure wherein the optical surfaces of the petals 12 are identical. The petals are made by electroforming, while the central hub is made by a combination of conventional machining and single point diamond turning.

The physical constraints which must be imposed upon each petal of a mosaic mirror structure such that the optical figure of the assembly is maintained, are those associated with tip, tilt, rotation, piston, and radial position with respect to the axis of the assembly. In order to provide or maintain these constraints, the hub assembly incorporates five registration pads 16 for each petal 12. Two of these registration pads provide axial registration and the other three registration pads are utilized to provide radial registration. The surfaces of the pads are single point diamond turned such that the faces of the axial pads are coplanar and the faces of the radial pads lie on the surface of a cylinder. Ideally, the two sets of pads should be single point diamond turned during a single set up; thereby ensuring that the plane of the axial pads is truly perpendicular to the axis of the cylinder which defines the radial pads.

The petals are electroformed with two built-in registration surfaces; a flat step 14 which is perpendicular to the axis of the parabola and a cylindrical surface which is perpendicular to the face of the step. The cylindrical surface must also be centered upon the optical axis and have a radius matching that of the radial registration pads on the hub.

When a petal is mated with the hub, the axial pads located on the flange of the hub constrain the petal in piston and tilt; the tilt axis being defined as an axis which lies perpendicular to the optical axis of the assembly. The pair of radial pads adjacent to the hub flange constrain the mirror in rotation and in radial position with respect to the axis of the assembly. It should be noted that, since the mirror assembly is rotationally symmetric, a rotation of the petal due to tangential sliding upon the radial pads is permitted. The third radial pad constrains the petal in the tip axis; defined here as the axis which is orthogonal to the previous defined tilt and rotation axes.

Figure 2:
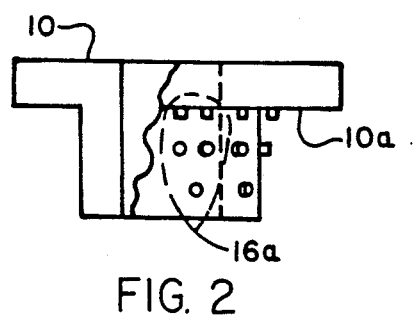
FIG. 2 is a plan view of the hub showing the registration pads in greater detail.

Turning now to FIG. 2, there is shown in greater detail the hub assembly 10 and the registration pads which align the petal segments with respect to the hub. The hub 10 comprises a hollow cylinder with a flange portion 10a. Each petal segment utilizes a group 16a of five registration pads to align a petal to the hub and other petal segments. There are three registration pads 16 on the outer cylindrical surface of the hub 10 and two registration pads 16 on the lower face of flange 10a to interact with the step 14 (FIG. 1) of a segment petal 12. The hub 10 may comprise either a solid or a cylinder, as shown, as a particular application may require.

The means by which each petal is held in registration with the hub may be any suitable conventional commercially available means. It should also be noted that the method of attachment would depend upon the size and weight of the assembly, the particular application of the assembly and its environment of use. For instance, assembly in space would present radically different requirements from those required for laboratory assembly.

Simple hub and petal assemblies of modest accuracy and size (up to about 1-meter diameter) can reasonably be expected to fall within the electroforming state-of-the-art in the near future. However, for larger assemblies, and especially for those required to be diffraction limited at visible wavelengths, it is likely that some form of post-assembly fine tuning will be required. Since the registration pads on the hub define completely the orientation and axial position of each petal, it seems logical to provide such fine tuning via the pads. Further, since the adjustment range that would be required of a fine tuning system would, at most, be on the order of a few microns, it is clearly much more practical to provide the adjustment via piezoelectric or electrorestrictive actuators rather than by a mechanical means, such as shims or micrometers. The electrically actuated approach also is advantageous in that it is not necessarily a one time adjustment, but rather provides the means for retuning the optic structure at any time during its life. This added advantage probably more than offsets the disadvantages of having to apply a predetermined set of voltages to the actuators whilst the optic is in use.

Piezoelectric or electrorestrictive actuator pads which have a total travel of one or two microns, have a thickness on the order of half a centimeter. For use in a mosaic mirror, the actuators would have a metal disc bonded to each face; the electroding of the actuators being such as to allow the discs to be at ground potential during operation. Also, the disc material would be chosen so as to be compatible with single point diamond turning. Each actuator subsassembly would first be bonded to the hub. The hub/actuator assembly would then be single point diamond turned, such that the faces of the axial actuators lie in a common plane and the faces of the radial actuators lie on the surface of a common cylinder. A mid-range voltage would be applied to the actuators during the turning operation; thereby providing the actuator pads with bidirectional travel relative to their nominal positions.

At this point, it seems pertinent to note that, as this technology develops, the lesser accuracy achieved during the early stages will be directly applicable to the production of mosaic millimeter wave antennas. Since the millimeter wave application to space systems is a rapidly growing field, it is quite possible that this less demanding application of electroformed mosaic structures may have a greater near-term significance than does the production of large optical components.

Although the invention has been described with reference to a particular embodiment, it will be understood to those skilled in the art that the invention is capable of a variety of alternative embodiments within the spirit and scope of the appended claims.

What is claimed is:

1. A hub and petal apparatus for mosaic structures comprises in combination:
   a hub having a centrally located axis of rotation, said hub having an outer surface which is parallel to said axis, and a flange which is located at one end of said hub extending radially outward therefrom,
   a plurality of petal segments which are substantially identical in shape, each petal segment of said plurality of petal segments including a step which is perpendicular to said axis of said hub and a cylindrical surface which is perpendicular to the face of said step, and,
   a plurality of registration pads attached to said hub for the precise adjustment of each petal segment of said plurality of petal segments to provide registration to optical tolerance with respect to other petal segments and said axis of said hub, a predetermined number of registration pads of said plurality of registration pads respectively cooperating with each petal segment of said plurality of petal segments to maintain said registration.

2. A hub and petal apparatus for mosaic structures as described in claim 1 wherein said plurality of registration pads include piezoelectric actuators to provide fine tuning adjustments of each petal segment in the order of a few microns.

3. A hub and petal apparatus for mosaic structures as described in claim 1 wherein said plurality of registration pads include electrostrictive actuators to provide fine tuning adjustments of each petal segment in the order of a few microns.

4. A hub and petal apparatus as described in claim 1 wherein said predetermined number of registration pads comprises five.

5. A hub and petal apparatus as described in claim 1 wherein said cylindrical surface of each petal segment is centered with respect to said axis of said hub.

6. A hub and petal apparatus as described in claim 1 wherein said plurality of registration pads constrains each petal segment of said plurality of petal segment in tip, tilt, rotation, piston and radial position with respect to said axis of said hub.

7. A hub and petal apparatus as described in claim 4 wherein two registration pads provide axial registration and three registration pads provide radial registration.

8. A hub and petal apparatus as described in claim 7 wherein the faces of the axial registration pads are coplanar and the faces of the radial registration pads lie on the surface of a cylinder.

9. A hub and petal apparatus as described in claim 8 wherein the plane of the axial registration pads are perpendicular to the axis of said cuter surface in which the radial registration pads are defined.

10. A hub and petal apparatus as described in claim 8 wherein said axial registration pads are located on said flange of said hub and said radial registration pads are located on said outer surface of said hub.

11. A hub and petal apparatus as described in claim 10 wherein said axial registration pads constrain said plurality of petal segments in piston and tilt, and two of said radial registration pads which are adjacent to said flange of said hub constrain said plurality of petal segments in rotation and radial position with respect to said axis of said hub, and a third radial registration pad constrains said plurality of petal segments in the tip axis.

* * * * *